Dec. 26, 1950 H. J. FRY 2,535,404
FISHING ROD HANDLE
Filed Oct. 9, 1946 2 Sheets-Sheet 2
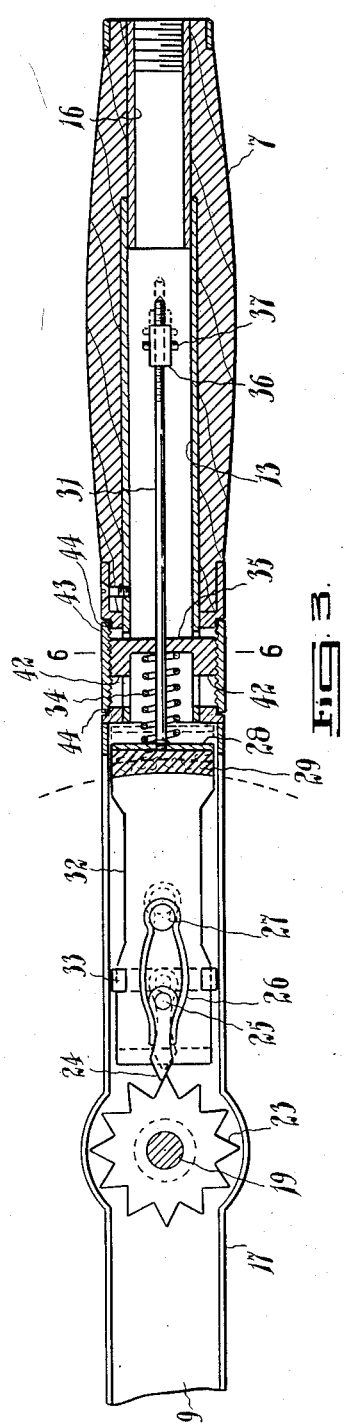
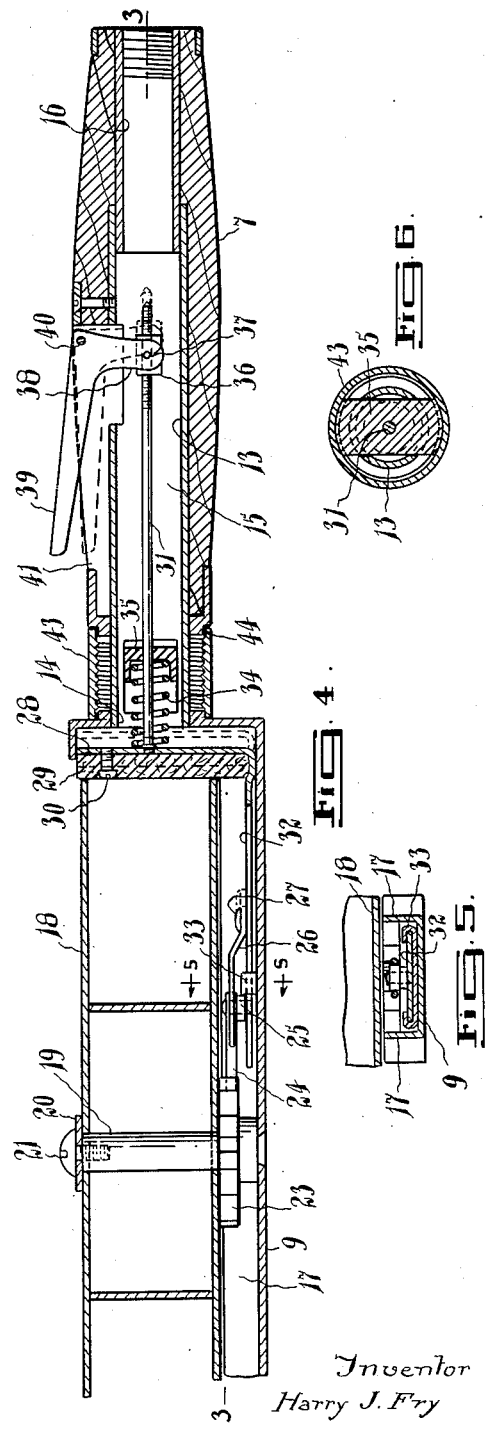
Inventor
Harry J. Fry
by Frederick C. Bromley
ATTY.

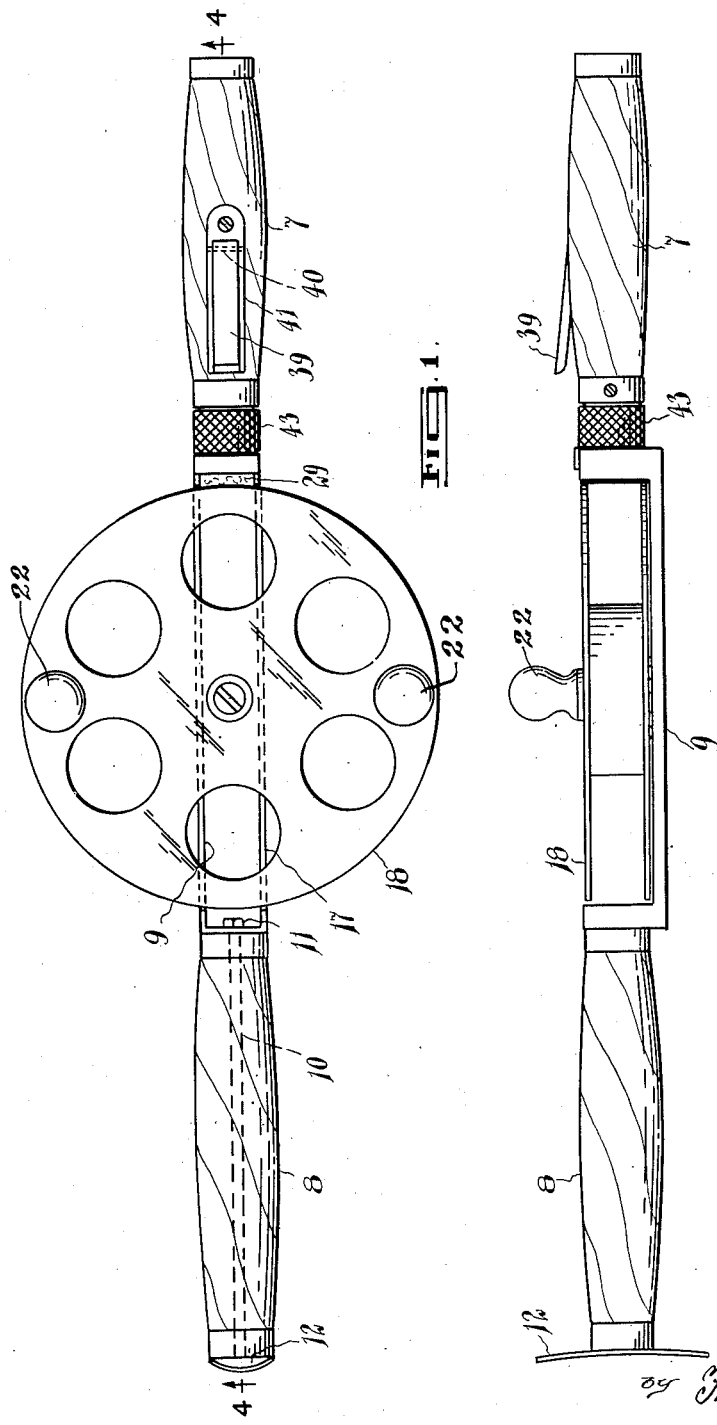

Patented Dec. 26, 1950

2,535,404

UNITED STATES PATENT OFFICE 2,535,404

FISHING ROD HANDLE

Harry J. Fry, Sault Ste. Marie, Ontario, Canada

Application October 9, 1946, Serial No. 702,257

6 Claims. (Cl. 43—20)

My invention appertains to improvements in fishing rod handles of the kind employed for trolling which are customarily provided with a brake and a click device for the reel.

The primary object of the present invention is to provide a handle structure in which the brake and click device are combined as a unit for concurrent release by movement of a single lever.

A further object of the invention is to provide a brake mechanism in which the drag on the reel can be quickly and easily varied by turning a collar in order to obtain the most desirable tension on the line as circumstances demand.

Another object is to produce a serviceable and reliable brake mechanism which can be readily set to possess the required braking force on the reel and which can be adjusted from time to time to compensate for wear.

Still another object is to provide a fishing rod handle suited to be conveniently held for manipulation of the control member by which the brake is released and the click device is disengaged.

With these and other objects in view the invention consists in the novel construction and arrangement of the fishing rod handle described in the ensuing specification and illustrated in the accompanying drawing.

In the drawing,

Fig. 1 is a plan view of the fishing reel handle.

Fig. 2 is a side view thereof.

Fig. 3 is a fragmentary longitudinal section of the fishing reel handle taken on line 3—3 of Fig. 4 showing the brake mechanism and click device.

Fig. 4 is a fragmentary longitudinal section taken on line 4—4 of Fig. 1.

Fig. 5 is a cross section taken on line 5—5 of Fig. 4.

Fig. 6 is a cross section taken on line 6—6 of Fig. 3.

In carrying out my invention I employ a fishing rod handle or frame of the general shape or form commonly adopted for trolling, in which there is provided a frontal hand grip 7 and a rear hand grip 8 united in spaced alignment by an offset reel support 9. The rear grip 8 is suitably secured to the intermediate member 9 as by means of a rod 10 and a fastening element 11, and is provided with an outwardly curved breast plate 12 which is a desirable adjunct to the handle.

The frontal grip 7 is secured to the intermediate member 9 by a cylindrical rod 13 preferably having its inner end 14 permanently attached to said intermediate member 9. The rod 13 is shown as extended through the major part of the length of the grip 7 to provide an axial opening 15, and at the outer end of this grip element there is provided a socket element 16 for attachment of the fishing rod. The socket element 16 may be internally threaded for making a screw-on connection for the fishing rod, or it may be otherwise devised as required, and if necessary an adapter may be used.

The intermediate member is preferably of a channel shape in cross section having its legs 17 turned inwardly. The reel 18 is mounted for rotation by means of a stub shaft 19 integral with or secured to said intermediate member. The reel is retained on the shaft 19 as by a washer 20 and a headed screw 21 and is turned by the usual handles 22. There may be a guide (not shown) of ordinary type for the line. A star wheel 23 forms a part of the click device and is rigid with the reel and disposed at the inner side thereof for concentric rotation.

A pawl 24 is pivoted at 25 for swinging in opposite directions and is mounted to engage the teeth of the star wheel. It is yieldably retained in a normal position for engaging the said teeth by spring means such as the flanking fingers 26 of spring metal which freely extend from fixed ends secured at 27.

The brake mechanism comprises a shoe 28 having a lining 29 of suitable material for frictional contact with the periphery of the reel. The lining 29 is shown as detachably secured in place as by a screw 30 which enables it to be readily replaced when worn.

It will be noted that the shoe is disposed outwardly of the reel at the inner end of the frontal grip 7 which is an advantageous location in that pressure of the shoe on the rim portion of the reel counteracts the pull of the line in a manner such that strain on the stub shaft is minimized and wear on the reel bearing is reduced. The shoe 28 is formed of a stiff plate, from the back of which a rod 31 extends axially into the opening 15 of the frontal grip for a substantial part of its length. The rod 31 is rigidly connected to the shoe and is guided for endwise movement for advancing it toward the reel and withdrawing it therefrom.

The plate of which the shoe is formed is extended at one side and bent at right angles to extend adjacent to the inner side of the intermediate member so as to provide a unitary supporting element 32 for the pawl 24 and the spring fingers 26 therefor. The supporting element 32 forms an extension plate which is guided for movement to and away from the star wheel 23 by means such as the guideways 33 on the inner side of the intermediate member 9.

The shoe 28 is spring-biased toward the reel as by a helical compression spring 34 encircling the rod 31 and seated at its inner end against the shoe, the outer end being shouldered against a backing element 35. The outer end of rod 31 is threadily engaged with a sleeve 36 having diametrically disposed trunnions 37 by which it is pivotally connected to an arm 38 of a bellcrank lever 39 which is pivoted at 40 in a recess 41 of the frontal grip 7 to extend in rearward direction. The spring 34 normally retains the brake in engagement with the reel and in this position the lever 41 projects from the recess 41 at an angle so that it will recede into this recess when depressed to release the brake. The threaded sleeve provides for adjustment of the lever with respect to the shoe 28.

The means for adjusting the spring pressure on the shoe comprises said backing element 35 against which the outer end of the spring 34 is shouldered. This backing element is formed as a transverse feed screw apertured to freely receive the rod 31 and fitted loosely in diametrical opposite slots 42 formed in the cylindrical rod 13 so that it slides longitudinally thereof without rotative movement. The feed screw 35 is threadedly engaged with an internally threaded collar or nut 43 which is rotatably seated as at 44 at the inner end of the frontal grip and shouldered against endwise movement. This collar or nut is knurled or otherwise roughened to enable it to be firmly grasped by hand for turning purposes. By turning the collar or nut in one direction the feed screw 35 is fed to increase the spring pressure on the shoe, and vice versa.

It will be manifest from the preceding description that when the brake is engaged with the reel the pawl is engaged with the star wheel, and that when the brake is released by depression of the lever 39 the pawl is freed from the star wheel. The pawl need only enter an interdental space of the star wheel for a short distance in the engaged position of the brake in order to operate as a click, and will accommodate wear on the brake lining without requiring an inordinate travel of the lever 39 in the disengaging movement. Neither click device nor the brake is required to operate while reeling in or paying out the line, nor in most instances while playing a fish. Both the click device and the brake may be disengaged by slight pressure on the lever 39 which can be readily applied by the little finger of the hand in grasping the frontal grip and this lever can be thus manipulated with ease for regulating the drag of the brake without changing or relaxing the other fingers of the hand by which the frontal grip 7 is held. The invention provides a fishing rod handle in which the pressure of the brake can be conveniently regulated as required. For instance, in trolling up a river against a swift current greater brake pressure or drag is demanded than while trolling with the current. Again, greater brake pressure is needed when trolling behind a motor boat than when trolling from a rowboat on account of the difference in speed of the crafts. Desired brake pressure is readily obtained by the use of the adjusting collar 43. The click device serves the usual purpose of sounding a warning when a fish strikes or the hook becomes snagged.

While the invention has been disclosed in a selected form, it will be understood that such changes in detail of the construction may be made as come within the scope of the subjoined claims.

What I claim is:

1. In a fishing rod handle, a reel support, a reel rotatably mounted thereon, a hand grip extended outwardly of said reel support having an axial opening therein and also having guide slots therein, said guide slots communicating with said axial opening and being open to opposite sides of said hand grip, a rod guidably extending into said axial opening, a brake shoe connected to said rod at the inner end of said hand grip and having a friction face for engaging said reel, a coil spring encircling said rod and seated at one end for urging said shoe into engagement with the reel, a backing member forming a shoulder for the other end of said spring and non-rotatably contained in said guide slots for movement axially of said rod, means on said hand grip for effecting such axial movement of said backing member in order to adjust the pressure of the spring on the shoe, and a hand lever fulcrumed on said hand grip and connected to said rod for disengaging the shoe from the reel.

2. In a fishing rod handle, a reel support, a reel rotatably mounted thereon, a hand grip extended outwardly of said reel support having an axial opening therein and also having guide slots therein, said guide slots communicating with said axial opening and being open to opposite sides of said hand grip, a rod guidably extending into said axial opening, a brake shoe connected to said rod at the inner end of said hand grip and having a friction face for engaging said reel, a coil spring encircling said rod and seated at one end for urging said shoe into engagement with the reel, a feed screw seating the other end of said spring and non-rotatably contained in said guide slots for movement axially of said rod, a member rotatably mounted on said grip and threadedly engaged with said feed screw for effecting such axial movement of the feed screw in order to adjust pressure of the spring on the shoe, and a hand lever fulcrumed on said hand grip and connected to said rod for disengaging the shoe from the reel.

3. In a fishing rod handle, a reel support, a reel rotatably mounted thereon, a hand grip extended outwardly of said reel support having an axial opening therein and also having guide slots therein, said guide slots communicating with said axial opening and being open to opposite sides of said hand grip, a rod guidably extending into said axial opening, a brake shoe connected to said rod at the inner end of said hand grip and having a friction face for engaging said reel, a coil spring encircling said rod and seated at one end for urging said shoe into engagement with the reel, a feed screw seating the other end of said spring and non-rotatably contained in said guide slots for movement axially of said rod, and a collar threadedly engaged with said feed screw and shouldered on said grip against endwise movement whereby to adjust pressure of the spring on the shoe, and a hand lever fulcrumed on said hand grip and connected to said rod for disengaging the shoe from the reel.

4. A fishing reel handle comprising a frame, a reel journalled thereon, a star wheel rotatable with said reel and disposed at a side thereof, a brake shoe guidably supported for reciprocal movement radially of said reel and disposed for engagement with the periphery of said reel, said brake shoe having a body part of rigid material provided with an angular extension disposed radially of said reel toward said star wheel, a spring pressing said brake shoe into engagement with the periphery of said reel, a pawl pivoted on said extension and engaged with said star wheel, resilient means retaining said pawl against pivotal movement, and manual means for disengaging said brake shoe, whereby the pawl is simultaneously disengaged from said star wheel.

5. A fishing reel handle comprising a frame, a reel journalled thereon, a star wheel rotatable with said reel and concentrically disposed at a side thereof, a brake shoe including a plate of rigid material disposed across said reel and having a facing of friction material for engaging the periphery thereof, said plate having a right-angular extension disposed radially of said reel toward said star wheel, means on said frame by which said plate is mounted to slide radially of said reel, a spring pressing said brake shoe into engagement with said reel, a pawl pivoted on said extension and engaged with said star wheel, a spring retaining said pawl against pivotal movement so that it may ride on the teeth of the star wheel, and manual means for disengaging said brake shoe, whereby said pawl is simultaneously disengaged from said star wheel.

6. A fishing reel handle as defined in claim 5, in which the means for slidably mounting the plate includes a guideway in which the extension is operably disposed.

HARRY J. FRY.

REFERENCES CITED

The following references are of record in the file of this patent:

UNITED STATES PATENTS

| Number | Name | Date |
|---|---|---|
| 739,316 | Irland | Sept. 22, 1903 |
| 1,689,072 | Grimsrud | Oct. 23, 1928 |
| 1,735,026 | Welch | Nov. 12, 1929 |
| 1,742,645 | Brundage | Jan. 7, 1930 |
| 2,208,493 | Brett | July 16, 1940 |
| 2,342,993 | Wright | Feb. 29, 1944 |
| 2,424,430 | Beyer | July 22, 1947 |

FOREIGN PATENTS

| Number | Country | Date |
|---|---|---|
| 171,950 | Great Britain | Dec. 1, 1921 |